United States Patent [19]
Tomisawa et al.

[11] Patent Number: 6,119,260
[45] Date of Patent: Sep. 12, 2000

[54] DECODER FOR EXECUTING ERROR CORRECTION AND ERROR DETECTION IN PARALLEL

[75] Inventors: Shinichiro Tomisawa, Gifu-ken; Masato Fuma, Ichinomiya, both of Japan

[73] Assignee: Sanyo Electric Co., Ltd., Osaka, Japan

[21] Appl. No.: 08/939,992

[22] Filed: Sep. 29, 1997

[30] Foreign Application Priority Data

Sep. 30, 1996 [JP] Japan .................................. 8-259667

[51] Int. Cl.[7] .................................................. H03M 13/00
[52] U.S. Cl. .......................................................... 714/758
[58] Field of Search .................................. 714/758, 755, 714/752, 763, 764, 768, 769, 772, 773

[56] References Cited

U.S. PATENT DOCUMENTS

| | | | |
|---|---|---|---|
| 3,668,632 | 6/1972 | Oldham, III .............................. | 714/775 |
| 5,530,708 | 6/1996 | Miya ........................................ | 714/795 |
| 5,581,715 | 12/1996 | Verinsky et al. ......................... | 710/129 |
| 5,610,929 | 3/1997 | Yamamoto ............................... | 714/758 |
| 5,661,848 | 8/1997 | Bonke et al. ............................ | 711/112 |
| 5,691,994 | 11/1997 | Acosta et al. ............................ | 714/758 |
| 5,696,774 | 12/1997 | Inoue et al. .............................. | 714/755 |
| 5,771,248 | 6/1998 | Katayama et al. ....................... | 714/752 |

OTHER PUBLICATIONS

Lee, patrick et al., Parallel Error–Trapping and Error–Detection Decoding, IEEE, pg. 35 to 38, Apr. 1991.

*Primary Examiner*—Albert De Cady
*Assistant Examiner*—Shelly A Chase
*Attorney, Agent, or Firm*—Sheridan Ross P.C.

[57] ABSTRACT

The present invention relates to an error correcting and detecting apparatus that executes a decode process at high speed. The error correcting and detecting apparatus receives digital data including an error correction code and an error detection code and performs error correction and error detection on the digital data. In one embodiment, the apparatus includes: an input interface for receiving the digital data from a recording medium and writing the digital data into a memory device; an error correction decoder for receiving the digital data from the memory device and performing error correction on the digital data in accordance with error correction codes; an error detection decoder for receiving the digital data from the memory device and performing error detection on the digital data in accordance with error detection codes; and an output interface for reading digital data from the memory device and outputting the read digital data, the read digital data having undergone the error correction and error detection. The error correction by the error correction decoder and the error detection by the error detection decoder are performed in parallel.

6 Claims, 4 Drawing Sheets

DECODER FOR EXECUTING ERROR CORRECTION AND ERROR DETECTION IN PARALLEL

BACKGROUND OF THE INVENTION

1. Field of the Invention

The present invention relates to an error correcting and detecting decoder and, more particularly, to an error correcting and detecting decoder that performs predetermined processes on digital data read from a recording medium in accordance with an error correction code and error detection code included in digital data.

2. Description of the Related Art

In compact disc read only memory (CD-ROM) systems, a digital audio compact disc (CD) is used as a read only memory (ROM) for digital data. To improve the reliability of digital data read from a CD, error correction is performed on the digital data twice. The first error correction is executed by a digital signal processor which is common to both an audio system and a CD-ROM system, and the second error correction is executed by a CD-ROM decoder of the CD-ROM system.

FIG. 1 is a block diagram of a CD-ROM system. The CD-ROM system includes a pickup 1, a pickup controller 3, an analog signal processor 4, a digital signal processor 5, a CD-ROM decoder 6, a buffer random access memory (RAM) 7 and a control microcomputer 8.

The pickup 1 irradiates light on a disk 2 to generate a voltage signal proportional to the intensity of the reflected light. The pickup controller 3 controls the read position of the pickup 1 with respect to the disk 2 so that the pickup 1 reads data from the disk 2 in the correct order. Servo control to turn the disk 2 at a predetermined velocity is performed in accordance with the position control of the pickup 1. The servo control keeps the linear velocity of tracks on the disk 2 constant.

The analog signal processor 4 receives the voltage signal from the pickup 1 and generates one frame of an Eight to Fourteen Modulation (EFM) data signal consisting of 588 bits. As shown in FIG. 2, EFM data includes a 24-bit sync signal assigned to the beginning of each frame, 3-bit connection bit fields and 14-bit data bit fields which are alternately provided in each frame after the sync signal.

The digital signal processor 5 receives the EFM signal from the analog signal processor 4 and performs EFM demodulation on the signal for conversion to 8 bits from 14 bits. In this EFM demodulation, 8-bit subcode data is produced from the first data bit field following the sync signal, and 32-byte symbol data is produced from the remaining thirty-two pieces of data bit fields. Further, the 32-byte symbol data is subjected to Cross-Interleave Reed-Solomon Code (CIRC) demodulation to yield one frame of CD-ROM data consisting of 24 bytes. The first error correcting process is completed with this CIRC demodulation.

The CD-ROM data is handled in a block by block manner, each block of data consisting of 2352 bytes (24 bytes×98 frames). As shown in FIG. 3, normally (in mode 1), one block of data includes a sync signal (12 bytes), a header (4 bytes), user data (2048 bytes), an error detection code (EDC) (4 bytes) and an error correction code (ECC) (276 bytes). In one block of data, 2340 bytes of data excluding the 12-byte sync signal has previously undergone a scrambling process and is reproduced by a descrambling process.

The CD-ROM decoder 6 receives the CD-ROM data from the digital signal processor 5 and performs error correction in accordance with the ECC and error detection in accordance with the EDC to provide the processed CD-ROM data to a host computer. Normally, therefore, after an error in data is corrected in accordance with the ECC, it is checked in accordance with the EDC to determine if the error was properly corrected. When the error has not been corrected properly, error correction is carried out again in accordance with the ECC, or an error flag is affixed to the CD-ROM data containing the error code.

The buffer RAM 7 is connected to the CD-ROM decoder 6 and temporarily stores CD-ROM data in a block by block manner. Since the ECC and EDC are included in one block of CD-ROM data, the CD-ROM decoder 6 requires at least one block of CD-ROM data. Therefore, the buffer RAM 7 stores one block of CD-ROM data for the CD-ROM decoder 6.

The control microcomputer 8 can be a one-chip microcomputer that incorporates an internal ROM and an internal RAM. The control microcomputer 8 controls the operation of the CD-ROM decoder 6 in accordance with a control program stored in the ROM. At the same time, the control microcomputer 8 receives command data from the host computer and subcode data from the digital signal processor 5 and temporarily stores those data in the internal RAM. The control microcomputer 8 controls the operations of the individual circuits in accordance with the command data (i.e., commands from the host computer) so that the host computer can receive the desired CD-ROM data from the CD-ROM decoder 6.

The CD-ROM decoder 6 performs the reception of the CD-ROM data from the digital signal processor 5 and the sending of the CD-ROM data to the host computer in parallel. In accordance with the input and output of data, writing and reading the CD-ROM data into and from the buffer RAM 7 are repeated. Normally, the CD-ROM decoder 6, in a time-sharing manner, accesses the buffer RAM 7 in a unit of byte or a unit of code for each input or output.

In general, the CD-ROM decoder 6 is configured such that error correction and detection for one block of CD-ROM data is completed within a predetermined period (hereinafter called "one block period") in accordance with a reference system clock. If a predetermined process cannot be accomplished within one block period for some reason, CD-ROM data is consecutively written in the buffer RAM 7. As a result, unprocessed CD-ROM data remains in the buffer RAM 7. As such a state continues, the buffer RAM 7 overflows. This overflow forces the CD-ROM decoder 6 to temporarily interrupt the reception of CD-ROM data.

For fast reproduction like ×2 reproduction, the CD-ROM system increases the playback speed of the disk 2 without changing the frequency of the reference system clock that is supplied to each circuit. The increased playback speed decreases the number of clock cycles supplied in one block period. In other words, the duration of one block period for error correction and detection is shortened and becomes insufficient. The reduction in the number of clock cycles makes it difficult to complete a predetermined process in one block period.

For fast transfer of CD-ROM data to the host computer, the frequency of data reading from the buffer RAM 7 can be increased. However, when such fast transfer is provided, the time available for reading and writing CD-ROM data from and into the buffer RAM 7 decreases. As a result, the error correction and detection is often delayed, thus making it difficult to accomplish a predetermined process in one block period.

The above-mentioned problems also arise in a digital video disc read only memory (DVD-ROM) system which uses a DVD or a high-density recording medium as a ROM. A DVD has approximately seven times the recording capacity of a CD. Therefore, there is a greater demand for a faster playback speed in a DVD-ROM system than for a CD-ROM system.

Therefore, there is a need to improve not only the data transfer speed but also the speed of the decode process performed by an error correction/detecting decoder.

SUMMARY OF THE INVENTION

The present invention relates to an error correcting and detecting decoder that executes a decode process at high speed. The present invention can be implemented in numerous ways including as an apparatus, a system and a method.

As an error correcting and detecting apparatus for receiving digital data including an error correction code and an error detection code and performing error correction and error detection on the digital data in accordance with the error correction code and error detection code, one embodiment of the invention includes: an input interface for receiving the digital data from a recording medium and writing the digital data into a memory device; an error correction decoder for receiving the digital data from the memory device and performing error correction on the digital data in accordance with the error correction code; an error detection decoder for receiving the digital data from the memory device and performing error detection on the digital data in accordance with the error detection code; and an output interface for reading digital data from the memory device and outputting the read digital data, the read digital data having undergone the error correction and error detection. The error correction by the error correction decoder and the error detection by the error detection decoder are performed in parallel.

As a computer system, an embodiment of the invention includes: a disk recording medium; a disk read circuit that reads digital data from the disk recording medium; an error correcting apparatus that corrects errors in the digital data read from the disk recording medium by the disk read circuit. The error correcting apparatus includes: an input interface for receiving the digital data from the disk read circuit and writing the digital data into a memory device; an error correction decoder for receiving the digital data from the memory device and performing error correction on the digital data in accordance with the error correction code; an error detection decoder for receiving the digital data from the memory device and performing error detection on the digital data in accordance with the error detection code; and an output interface for reading digital data from the memory device and outputting the read digital data, the read digital data having undergone the error correction and error detection. The error correction by the error correction decoder and the error detection by the error detection decoder are performed in parallel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

The present invention relates to an error correcting and detecting decoder that executes a decode process at high speed. An error correcting and detecting decoder according to one embodiment of the present invention will now be described with reference to the accompanying drawings.

Figure 4:
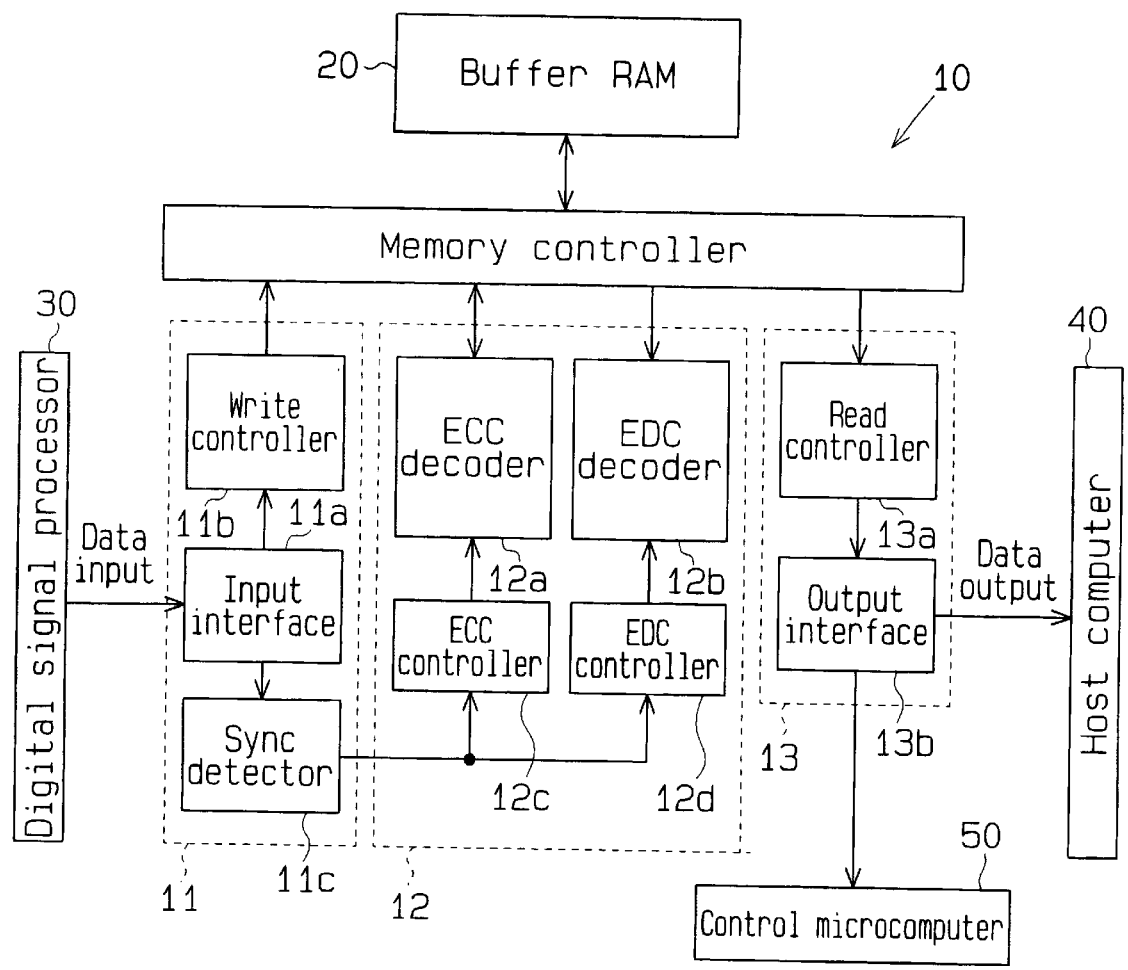
FIG. 4 is a block diagram illustrating an error correcting and detecting decoder according to one embodiment of the invention.

FIG. 4 is a block diagram illustrating a CD-ROM decoder 10 according to one embodiment of the invention. The CD-ROM decoder 10 includes a DSP interface circuit 11, an error correcting and detecting circuit 12, a host interface circuit 13 and a memory controller 14 all connected to a buffer RAM 20. The DSP interface circuit 11 includes an input interface 11a, a write controller 11b and a sync detector 11c.

Figure 3:
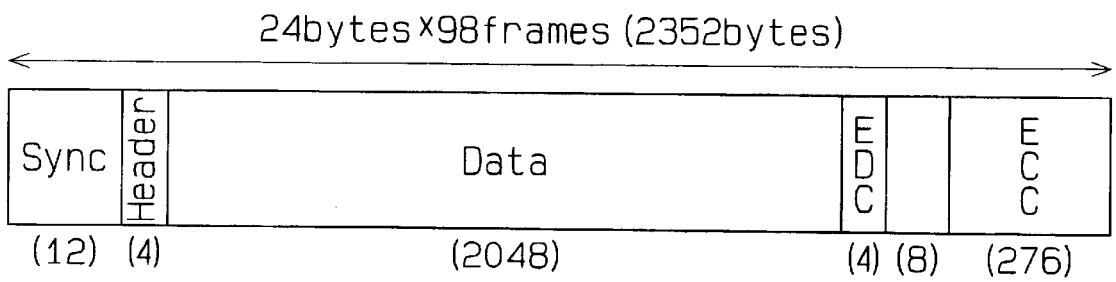
FIG. 3 shows the format of CD-ROM data produced by the CD-ROM system in FIG. 1.

The input interface 11a, provided for interface with a digital signal processor 30, receives CD-ROM data of a predetermined format which has undergone digital signal processing and supplies it to the write controller 11b. The CD-ROM data is handled in a block by block manner consisting of 98 frames (2352 bytes) as shown in FIG. 3. Data in each block excluding a sync signal is scrambled. The input interface 11a descrambles 2340-byte data in one block of CD-ROM data excluding the 12-byte sync signal and sends the CD-ROM data including the descrambled data to the write controller 11b.

The write controller 11b writes the CD-ROM data in the buffer RAM 20 at a predetermined address under the control of the memory controller 14. At this time, the write controller 11b operates so the CD-ROM data is stored in the buffer RAM 20 within a predetermined period (one block period) for processing one block.

The buffer RAM 20 stores CD-ROM data in a block by block manner. The buffer RAM 20 has sufficient capacity to store at least four blocks of CD-ROM data, namely one block of CD-ROM data for the DSP interface circuit 11, two blocks of CD-ROM data for the error correcting and detecting circuit 12, and one block of CD-ROM data for the host interface circuit 13.

The sync detector 11c acquires the sync signal from the CD-ROM data and produces a block sync signal indicating the head timing of each block. This block sync signal is supplied to the error correcting and detecting circuit 12 for the timing control for error correction and detection.

The error correcting and detecting circuit 12 includes an ECC decoder 12a, an EDC decoder 12b, an ECC controller 12c and an EDC controller 12d. The ECC decoder 12a reads one block of CD-ROM data from the buffer RAM 20 under the control of the memory controller 14 and performs error correction thereon in accordance with the error correction code (ECC). This error correction employs, for example, an interleave system using a Reed-Solomon code. In this system, an error contained in data is detected and the detected error is corrected. Then the CD-ROM data (as corrected) is written in the buffer RAM 20 so that erred data is replaced with error-corrected data.

The ECC decoder 12a receives the first block of CD-ROM data from the DSP interface circuit 11 and performs error correction of the first block of CD-ROM data. The first block of CD-ROM data is then stored in the buffer RAM 20. The ECC decoder 12a further receives the second block of CD-ROM data from the DSP interface circuit 11 after one block period. In other words, after error correction of the first block of CD-ROM data is completed in one block period, the second block of CD-ROM data is initially written in the buffer RAM 20.

The EDC decoder 12b receives one block of CD-ROM data from the buffer RAM 20 and performs error detection thereon in accordance with the error detection code (EDC). This error detection is carried out in accordance with a code, such as Cyclic Redundancy Code (CRC) which has a higher detection precision than the error detection by the ECC decoder 12a.

Specifically, the EDC decoder 12b receives the first block of CD-ROM data from the buffer RAM 20 and performs error detection. This error detection is performed one block period before the processing of the second block of CD-ROM data by the ECC decoder 12a. That is, after error correction of the first block of CD-ROM data is completed in one block period, the second block of CD-ROM data is written in the buffer RAM 20. Alternatively, the error detection is performed two block periods before the writing of the second block of CD-ROM data by the DSP interface circuit 11. In other words, after error correction and error detection of the first block of CD-ROM data are completed in two block periods, the second block of CD-ROM data is written in the buffer RAM 20.

The ECC controller 12c receives the block sync signal from the sync detector 11c and activates the ECC decoder 12a in accordance with the block sync signal. The EDC controller 12d also receives the block sync signal from the sync detector 11c and activates the EDC decoder 12b in accordance with the block sync signal.

When the sync signal representing the head of the second block of CD-ROM data is detected, the first block of CD-ROM data that directly precedes the second block of CD-ROM data has already been written in the buffer RAM 20. When the sync signal of the second block of CD-ROM data is detected, therefore, the ECC and EDC controllers 12c and 12d respectively control the ECC decoder 12a and the EDC decoder 12b so that the decoders 12a and 12b start the processing of the first block of CD-ROM data.

The ECC controller 12c and the EDC controller 12d designate read addresses in the buffer RAM 20 so that the first block of CD-ROM data for the ECC decoder 12a and the second block of CD-ROM data for the EDC decoder 12b are shifted from each other by one block. In other words, the ECC controller 12c and the EDC controller 12d designate read addresses in the buffer RAM 20 so that the first block of CD-ROM data for the ECC decoder 12a and the second block of CD-ROM data for the EDC decoder 12b do not overlap each other. Accordingly, the ECC decoder 12a and the EDC decoder 12b execute their processes in parallel at predetermined timings.

The host interface circuit 13 includes a read controller 13a and an output interface 13b. The read controller 13a reads the CD-ROM data, which has undergone a predetermined process by the error correcting and detecting circuit 12, from the buffer RAM 20 under the control of the memory controller 14. The read controller 13a supplies the CD-ROM data to the output interface 13b.

The output interface 13b serves as an interface with a host computer 40. The output interface 13b supplies CD-ROM data, read from the buffer RAM 20 via the memory controller 14 and the read controller 13a, to the host computer 40. The output interface 13b receives various control commands from the host computer 40 and supplies those commands to a control microcomputer 50. The CD-ROM decoder 10 may also be provided with a write circuit which receives various control commands from the host computer 40 and temporarily stores those commands in the buffer RAM 20.

The memory controller 14 is connected between the buffer RAM 20 and the DSP input interface 11, the error correcting and detecting circuit 12 and the host interface circuit 13. The memory controller 14 controls the exchange of CD-ROM data between the individual circuits 11, 12 and 13 and the buffer RAM 20 in a block by block manner. The DSP interface circuit 11, the error correcting and detecting circuit 12 and the host interface circuit 13 respectively handle different blocks of CD-ROM data. Specifically, the DSP interface circuit 11 writes one block of CD-ROM data in the buffer RAM 20. The error correcting and detecting circuit 12 reads and writes one block of CD-ROM data from and into the buffer RAM 20. The host interface circuit 13 reads one block of CD-ROM data from the buffer RAM 20. Therefore, the memory controller 14 is configured such that the individual circuits 11, 12 and 13 access the buffer RAM 20 so that different blocks of CD-ROM data are independently written into or read from the buffer RAM 20. This structure allows the individual circuits 11, 12 and 13 to concurrently access different blocks of CD-ROM data in the buffer RAM 20 in a block by block manner.

Figure 5:
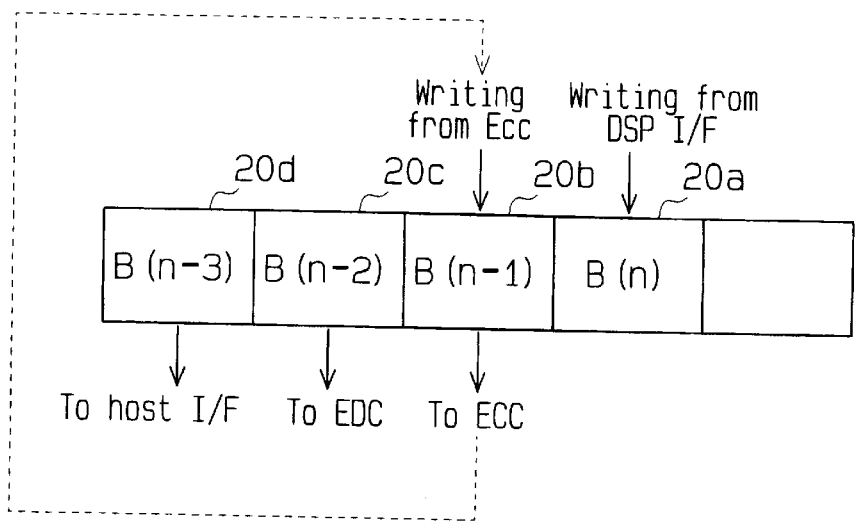
FIG. 5 shows the exchange of CD-ROM data between the error correcting and detecting decoder and a buffer RAM as shown in FIG. 4.
Figure 6:
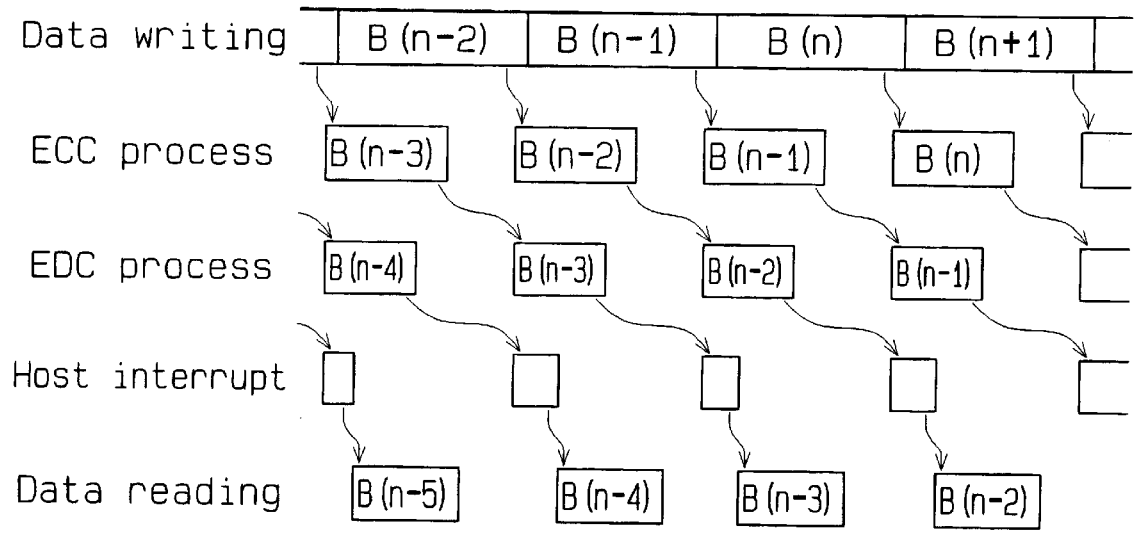
FIG. 6 is a timing chart exemplifying the process of the error correcting and detecting decoder.

FIG. 5 shows the writing and reading of CD-ROM data into and from the buffer RAM 20 which are executed by the memory controller 14. FIG. 6 is a timing chart exemplifying the processes of the individual circuits 11, 12 and 13 in the CD-ROM decoder 10. In FIG. 5, consecutive (n-3)-th to n-th blocks of CD-ROM data B(n-3) to B(n) are stored in first to fourth areas 20a to 20d in the buffer RAM 20.

The CD-ROM data B(n) written in the first area 20a is the CD-ROM data that is currently supplied to the buffer RAM 20 from the DSP interface circuit 11. The CD-ROM data B(n-1) written in the second area 20b is the CD-ROM data that has been written in the buffer RAM 20 one block before the CD-ROM data B(n). The CD-ROM data B(n-2) written in the third area 20c is the CD-ROM data that has been written in the buffer RAM 20 one block before the CD-ROM data B(n-1) and has undergone error correction. The CD-ROM data B(n-3) written in the fourth area 20d is the CD-ROM data that has been written in the buffer RAM 20 one block before the CD-ROM data B(n-2) and has undergone error correction and error detection.

FIG. 6 is a timing chart exemplifying the processing by the CD-ROM decoder 10. For the error correction by the ECC decoder 12a, the reading and writing (rewriting) of the (n−1)-th block of CD-ROM data B(n−1) are executed in parallel to the writing of the CD-ROM data B(n). For the error detection by the EDC decoder 12b, the reading of the (n−2)-th block of CD-ROM data B(n−2) is executed in parallel to the writing of the CD-ROM data B(n). For data supply to the host interface circuit 13, the (n−3)-th block of CD-ROM data B(n−3) is read in response to an interrupt instruction from the host computer 40.

As described above, the memory controller 14 operates so that different blocks of CD-ROM data, shifted from one another by one block, are written into and read from the buffer RAM 20 in accordance with the operational statuses of the DSP interface circuit 11, the ECC decoder 12a, the EDC decoder 12b and the host interface circuit 13. That is, the memory controller 14 operates so that different blocks of CD-ROM data are read from the buffer RAM 20 in accordance with addresses designated by the ECC controller 12c and the EDC controller 12d. The ECC decoder 12a and the EDC decoder 12b can therefore perform their operations in parallel. This improves the processing speed of the error correcting and detecting circuit 12 without changing the frequency of the operational clock to each circuit.

Figure 7A:
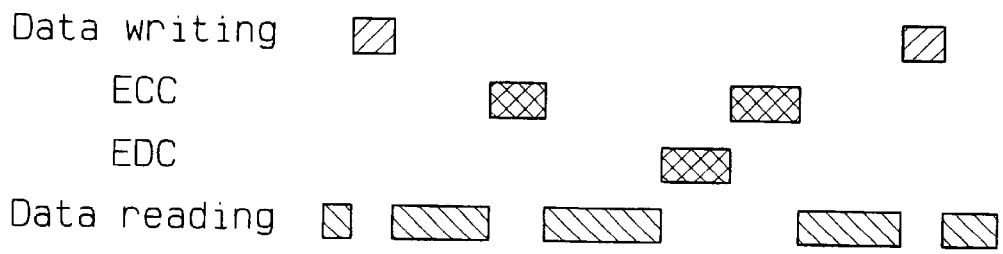
FIG. 7A illustrates access states in data writing, error correction, error detection and data reading according to the embodiment.

Access to the buffer RAM 20 is time-divisionally executed with respect to individual blocks. As shown in FIG. 7A, for example, the writing of data from the DSP interface circuit 11 and the reading of data into the host interface circuit 13 are time-divisionally executed. The DSP interface circuit 11 accesses the buffer RAM 20 in synchronism with the input of the CD-ROM data. This access is therefore performed in an approximately constant cycle. By contrast, the host interface circuit 13 accesses the buffer RAM 20 in accordance with the processing status of the host computer 40 connected to the host interface circuit 13. This access is thus carried out irregularly. The memory controller 14 and the control microcomputer 50 monitor those accesses. In accordance with such monitoring, the memory controller 14 and the control microcomputer 50 assign an interval between the accesses as the period for accessing the buffer RAM 20 by the error correcting and detecting circuit 12.

According to this embodiment, when a transfer request from the host computer 40 and access to the buffer RAM 20 for error correction are not made, memory access for error detection, which is performed in parallel with the error correction, is executed. The duration of time in which there is no access to the buffer RAM 20 is reduced, thus improving the access efficiency of the buffer RAM 20.

Figure 1:
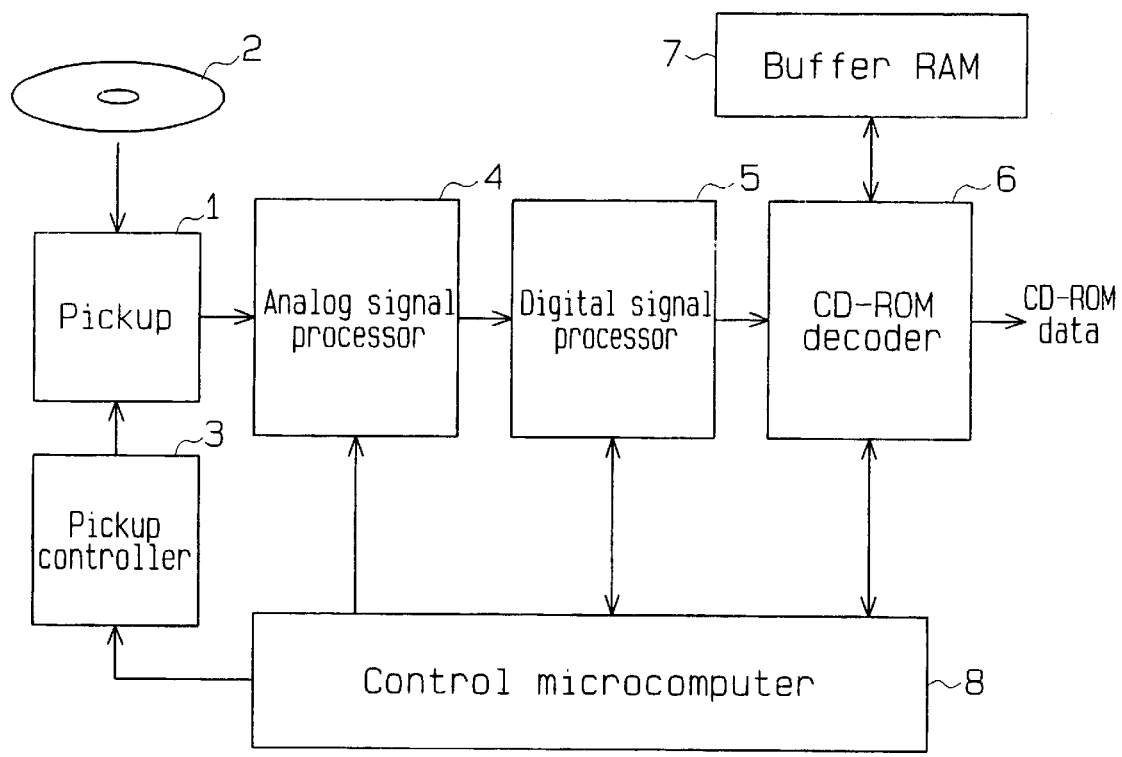
FIG. 1 is a block diagram illustrating a conventional CD-ROM system.
Figure 2:
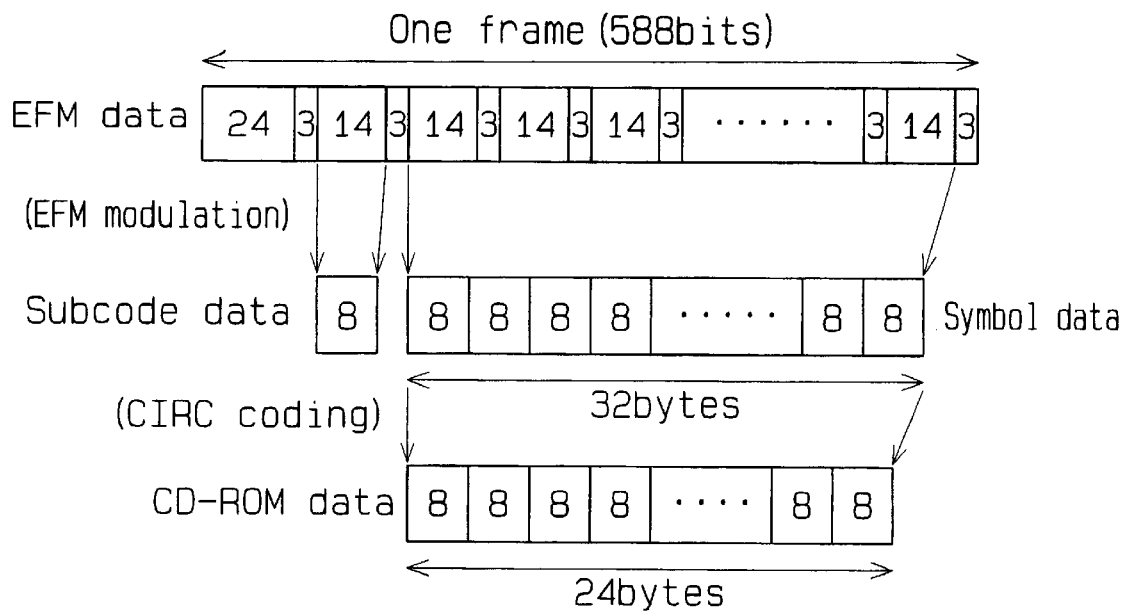
FIG. 2 shows the format of data produced in each circuit of a CD-ROM system as CD-ROM data is produced from data read from a disk.
Figure 7B:
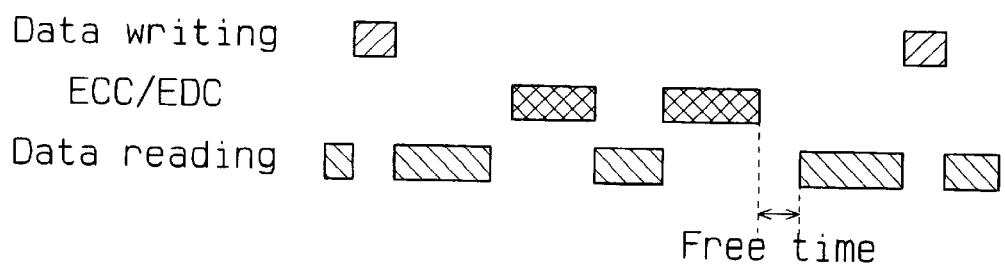
FIG. 7B illustrates access states in data writing, error correction, error detection and data reading according to a prior art example.

The conventional CD-ROM decoder 6 shown in FIG. 1 consecutively performs the ECC decoding process and the EDC decoding process. As shown in FIG. 7B, therefore, there is a large free time to access the buffer RAM 7. When there is no transfer request for CD-ROM data from the host computer, no access is made to the buffer RAM 7 while the position of an error and the number of errors are computed in the error correcting process. This inevitably produces a time period in which no access is made to the buffer RAM 7 before and after the ECC/EDC process in the interval between accesses by the host computer.

According to the embodiment of the invention, the amount of CD-ROM data to be stored in the buffer RAM 20 is increased by one block as compared with the ECC/EDC process of the conventional CD-ROM decoder 6. As the buffer RAM according to the embodiment has a sufficient memory capacity to store more CD-ROM data than necessary while securing the operational margin, however, nothing undesirable or critical to data storage occurs.

It should be apparent to those skilled in the art that the present invention may be embodied in many other specific forms without departing from the spirit or scope of the invention. Particularly, it should be understood that this invention may also be embodied in a data reading system which uses a recording medium like a CD. One example of such a system is a DVD (Digital Video Disc) system. Therefore, the present examples and embodiment are to be considered as illustrative and not restrictive and the invention is not to be limited to the details given herein, but may be modified within the scope and equivalence of the appended claims.

What is claimed is:

1. An error correcting and detecting apparatus for receiving digital data including an error correction code and an error detection code and performing error correction and error detection on said digital data in accordance with said error correction code and error detection code, said apparatus comprising:

an input interface for receiving the digital data from a recording medium and writing said digital data into a memory device;

an error correction decoder for receiving the digital data from said memory device and performing error correction on said digital data in accordance with said error correction code;

an error detection decoder for receiving the digital data from said memory device and performing error detection on the digital data in accordance with said error detection code; and an output interface for reading digital data from said memory device and outputting the read digital data, the read digital data having undergone the error correction and error detection;

wherein the digital data is transferred in a block by block manner;

wherein said error correction decoder receives a first block of digital data from said memory device and executes the error correction on said first block of digital data, and said error detection decoder receives a second block of digital data from said memory device and executes the error detection on said second block of digital data, said second block of digital data preceding said first block of digital data and having undergone the error correction; and wherein the error correction by said error correction decoder and the error detection by said error detection decoder are performed in parallel.

2. An error correcting and detecting apparatus for receiving digital data including an error correction code and an error detection code and performing error correction and error detection on said digital data in accordance with said error correction code and error detection code, said apparatus comprising:

an input interface for receiving the digital data from a recording medium and writing said digital data into a memory device;

an error correction decoder for receiving the digital data from said memory device and performing error correction on said digital data in accordance with said error correction code;

an error detection decoder for receiving the digital data from said memory device and performing error detection on the digital data in accordance with said error detection code; and an output interface for reading digital data from aid memory device and outputting the read digital data, the read digital data having undergone the error correction and error detection;

wherein the digital data is transferred in a block by block manner;

wherein said error correction decoder receives a first block of digital data from said memory device and executes the error correction on said first block of digital data, and said error detection decoder receives a second block of digital data from said memory device and executes the error detection on said second block of digital data, said second block of digital data preceding said first block of digital data and having undergone the error correction;

wherein the error correction by said error correction decoder and the error detection by said error detection decoder are performed in parallel;

wherein said input interface includes a detection circuit, connected to said error detection decoder and said error correction decoder, for detecting a head position of each block of the digital data and for supplying a detection signal to said error detection decoder and said error correction decoder, and wherein said error detection decoder and said error correction decoder start associated processes in response to said detection signal.

3. A computer data reading system, comprising:

a disk recording medium;

a disk read circuit that reads digital data from said disk recording medium;

an error correcting apparatus that corrects errors in the digital data read from said disk recording medium by said disk read circuit, said error correcting apparatus includes:

an input interface for receiving said digital data from said disk read circuit and writing said digital data into a memory device;

an error correction decoder for receiving the digital data from said memory device and performing error correction on said digital data in accordance with the error correction code;

an error detection decoder for receiving the digital data from said memory device and performing error detection on the digital data in accordance with the error detection code; and an output interface for reading digital data from said memory device and outputting the read digital data, the read digital having undergone the error correction and error detection;

wherein the digital data is transferred in a block by block manner, wherein said error correction decoder receives a first block of digital data from said memory device and executes the error correction on said first block of digital data, and said error detection decoder receives a second block of digital data from said memory device and executes the error detection on said second block of digital data, said second block of digital data preceding said first block of digital data and having undergone the error correction, and wherein the error correction by said error correction decoder and the error detection by said error detection decoder are performed in parallel.

4. The computer data reading system as recited in claim 3, wherein said disk recording medium is a compact disk.

5. The computer data reading system as recited in claim 3, wherein said disk recording medium is a digital video disk.

6. A method for correcting and detecting errors, comprising:

receiving into an input interface digital data from a recording medium;

writing said digital data into a memory device;

receiving into an error correction device said digital data from said memory device;

performing error correction on said digital data in accordance with an error correction code;

receiving into an error detection decoder said digital data from said memory device;

performing error detection on said digital data in accordance with an error detection code;

reading digital data from said memory device using an output interface; and outputting said digital data after said reading digital data has undergone said error correction and error detection, said error correction and said error detection performed in parallel.

* * * * *